United States Patent [19]

Maehara

[11] Patent Number: 4,866,290
[45] Date of Patent: Sep. 12, 1989

[54] IMAGE READER WITH IMAGE POINT DATA AVERAGING

[75] Inventor: Yoshiaki Maehara, Fukuoka, Japan

[73] Assignee: Matsushita Electric Industrial Co., Ltd., Osaka, Japan

[21] Appl. No.: 131,007

[22] Filed: Dec. 10, 1987

[30] Foreign Application Priority Data

Dec. 23, 1986 [JP] Japan .................................. 61-306935

[51] Int. Cl.⁴ .......................... H01J 40/14; H04N 1/40
[52] U.S. Cl. ...................................... 250/578; 358/464
[58] Field of Search ................. 250/578; 358/282, 283

[56] References Cited

U.S. PATENT DOCUMENTS

| | | | |
|---|---|---|---|
| 4,577,235 | 3/1986 | Kannapell et al. | 358/282 |
| 4,623,937 | 11/1986 | Watanabe | 250/578 |
| 4,650,988 | 3/1987 | Suzuki et al. | 250/578 |
| 4,676,596 | 6/1987 | Kato et al. | 250/578 |
| 4,707,745 | 11/1987 | Sakano | 358/283 |
| 4,720,637 | 1/1988 | Clark | 250/578 |
| 4,724,488 | 2/1988 | Van Daele et al. | 358/282 |
| 4,742,400 | 5/1988 | Tsuji | 358/283 |
| 4,760,460 | 7/1988 | Shimotohno | 358/283 |

FOREIGN PATENT DOCUMENTS

0231282 11/1985 Japan .................................. 358/283

OTHER PUBLICATIONS

Brandley, "Pseudo-Halftone Generation", IBM Tech. Disc. Bull., vol. 20, No. 4, 9/77, p. 1300.

Primary Examiner—David C. Nelms
Assistant Examiner—Michael Messinger
Attorney, Agent, or Firm—Wenderoth, Lind & Ponack

[57] ABSTRACT

In general, an image reader is provided with an image sensor wherein a plurality of reading devices are disposed in a row so as to be able to read image data of a first line of an original. This image sensor is then moved in the direction perpendicular to the row of the reading devices so as to read image data of the next line. As a result, image data of the original is read in a distributed manner at each of a number of lattice reading points of an original. The image reader of the present invention is provided with a filter which does not allow light of certain frequencies to pass through. The light which is stopped has frequencies exceeding half the spatial frequency of a lattice of the reading points. The image reader inputs through the filter image data from four reading points which are disposed adjacent to each other. An averaged data item, which is averaged in an arithmetic mean manner, from four image data items, is output as an averaged image datum. The image reader also outputs an image data item which is averaged in an weighted mean manner from nine adjacent reading points. This output is obtained by again averaging four adjacent image data, which have been averaged in the arithmetic manner, in the same arithmetic manner.

8 Claims, 8 Drawing Sheets

|  | ADDRESS | 1 | 2 | 3 | 4 | 5 | 6 | 7 |
|---|---|---|---|---|---|---|---|---|
| NO. OF LINES | | | | | | | | |
| LINE a | | A1 | A2 | A3 | A4 | A5 | A6 | A7 |
| LINE b | | B1 | B2 | B3 | B4 | B5 | B6 | B7 |
| LINE c | | C1 | C2 | C3 | C4 | C5 | C6 | C7 |
| LINE d | | D1 | D2 | D3 | D4 | D5 | D6 | D7 |

SUB-SCANNING DIRECTION

MAIN SCANNING DIRECTION

|  | ADDRESS | 1 | 2 | 3 | 4 | 5 | 6 | 7 |
|---|---|---|---|---|---|---|---|---|
| NO. OF LINES | | | | | | | | |
| LINE a | | 1 | 2 | 1 | | | | |
| LINE b | | 2 | 4 | 2 | | | | |
| LINE c | | 1 | 2 | 1 | | | | |
| LINE d | | | | | | | | |

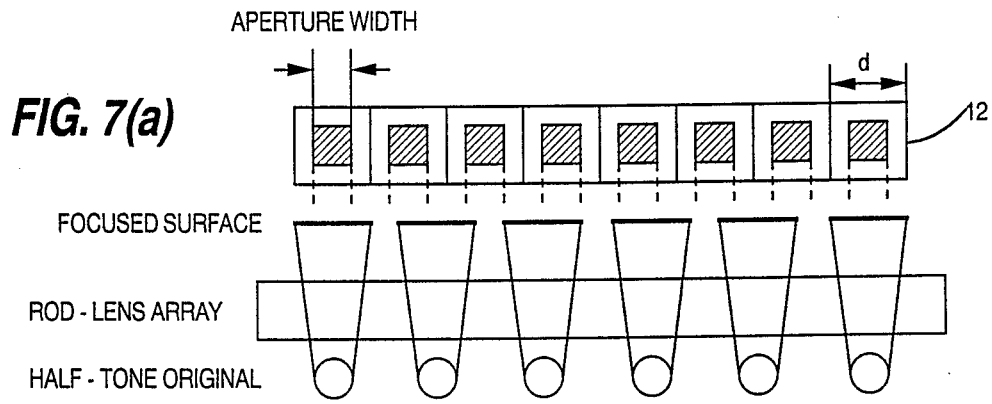
FIG. 7(a)
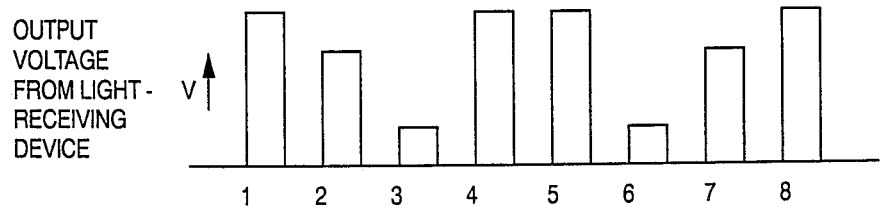
FIG. 7(b)
FIG. 7(c)
ARITHMETIC MEAN IMAGE DATA
| 1 | 2 | 3 | 4 | 5 | 6 | 7 | 8 |
|---|---|---|---|---|---|---|---|
| 10 | 7 | 3 | 10 | 10 | 3 | 7 | 10 |
FIG. 7(d)
ARITHMETIC MEAN IMAGE DATA
| 1' | 2' | 3' | 4' |
|---|---|---|---|
| 8 | 6 | 6 | 8 |

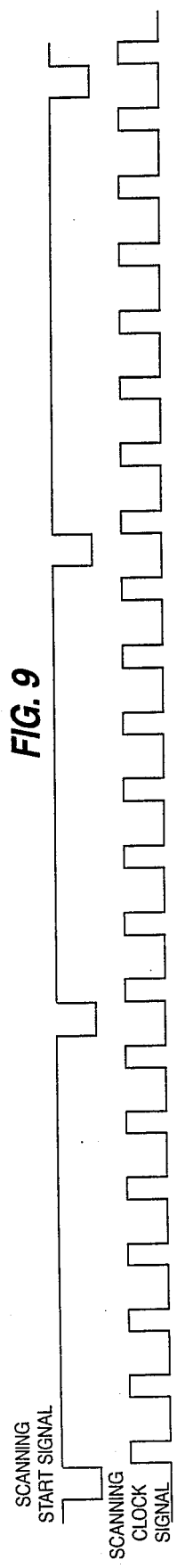
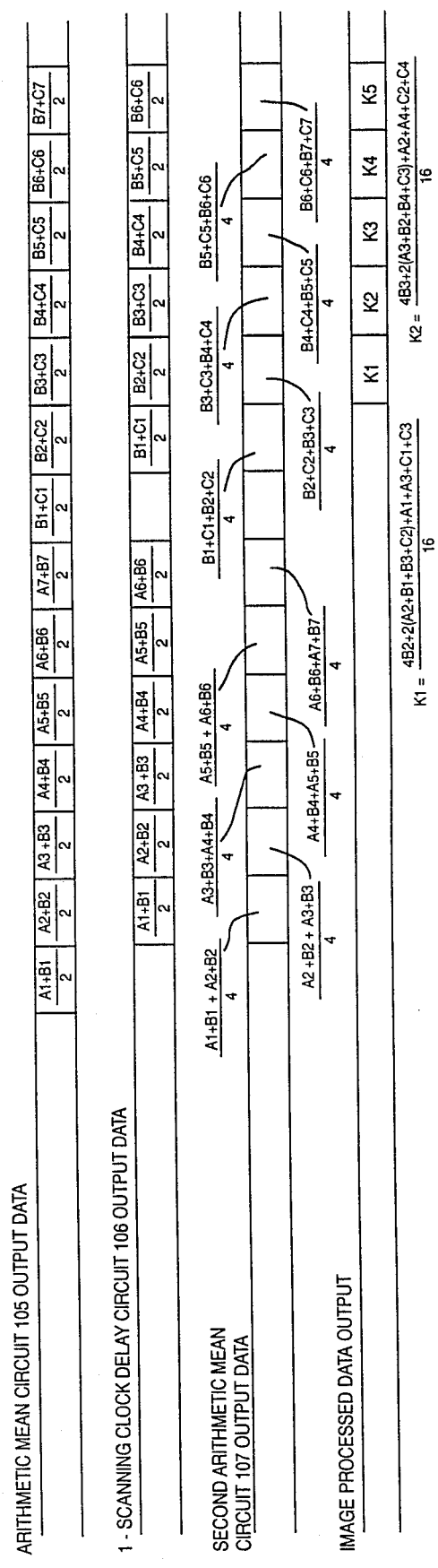
FIG. 9

IMAGE READER WITH IMAGE POINT DATA AVERAGING

BACKGROUND OF THE INVENTION

This invention relates to an image reader which is capable of reading image data from an original that has a large number of gradations, for use in facsimile and digital copying machines and so forth.

A conventional image reader is provided with a charge coupled device (abbreviated to CCD hereinafter) image sensor which reads image data for a line using reading devices thereof, and sequentially outputs the image data which has been read by the CCD.

The operation of the conventional image reader will now be described.

The direction in which the image reading devices of the CCD image sensor are disposed is called a main scanning direction, while the direction perpendicular to this main scanning direction is called a sub-scanning direction. The CCD image sensor is supported so as to be capable of moving in the sub-scanning direction.

The image reader irradiates the surface of an original with light. The light reflected from the surface of the original is focused to form an image on the reading devices of the CCD image sensor by means of a rod-lens array. The reading devices of the CCD image sensor output voltages corresponding to the image data at each of a number of points of the original. The CCD image sensor sequentially outputs the data obtained by each reading device, in correspondence with scanning clock signals.

The output voltages are amplified to increase each data item obtained by the reading devices to a desired level by means of an amplifier. The amplified voltages are converted to obtain digital values in accordance with the levels of brightness of the reflected light, by means of an analog/digital converter.

Image data of a large number of gradations for a line can be obtained by the image reader by way of conducting the above operation over one line in the main scanning direction.

The carriage is then moved one line space in the subscanning direction so as to read image data of the next line. Image data of the entire surface of the original can be read by this image reader by way of repeating the above operation over the entire surface of the original.

The conventional image reader is not only used for reading drawings or text, but it is also used for reading photographs in magazines.

The conventional image reader, however, encounters a problem because it reads image data of an original such as a photograph by a CCD image sensor having a finite number of reading devices arranged in a row. The problem is raised by the density of reading lines of 4 lines/mm or thereabout in both the main scanning direction and the sub-scanning direction. Therefore, false signals, which are moire fringes, are generated by interference between the half-tone dots used to form the original photograph in the magazine and the reading lines of the CCD image sensor. This interference is caused by the arrangement of both the half-tone dots and the reading lines which are disposed in a distributed manner. As a result, the quality of the read half-tone dot prints read by the conventional image reader is excessively deteriorated In order to overcome this problem, an image reader is known wherein the width of an aperture which is the effective width for reading is increased with respect to the densities of the main scanning reading lines and the sub-scanning reading lines.

Another solution to the problem is provided by another image reader in which the densities of the main scanning reading lines and the sub-scanning reading lines are arranged to be sufficiently large with respect to the spatial frequency of the original print to be read.

The latter image reader, however, raises a problem in that the necessary density of reading lines increases as the density of the half-tone dots increases. As a result, the number of reading devices of the CCD image sensor becomes very large, and the number of image data items also becomes very large. The operating speed of the scanning clock must be increased, and the speed of the processing system must also be increased, so that, as a result, the image reader system becomes expensive.

The former image reader which has a CCD image sensor with a wider aperture, suffers from the following problem. That is, the generation of false signals cannot be prevented by enlarging the width of the aperture when the density of the half-tone dots exceeds 2 lines/mm because the density of the reading lines is 4 lines/mm.

A conventional method which sacrifices the accuracy of reading to a certain degree so as to prevent moire fringes is known. The conventional image reader which uses a CCD image sensor with a wider aperture averages image data of four or nine adjacent points. The image reader in which image data of nine points is averaged to obtain arithmetic mean data will now be described.

The image reader reads image data of reading points over a plurality of lines, and temporarily stores the image data which has read. The image reader then reads data of a reading point and the eight points surrounding that point. Each data item is multiplied by coefficients to which weighting corresponding to the positional relationship of the reading points have been added. The data which has been weighted in this manner is then added, and is averaged to calculate arithmetic mean data of the reading point.

This type of image reader takes too long to output data after reading, and, as a result, a problem is raised in that the reading speed of the system cannot be raised because the image reader has a step in which data which has been read is temporarily stored in a memory, and this stored data is read and averaged.

SUMMARY OF THE INVENTION

An object of the present invention is to provide an image reader which is capable of preventing moire fringes when an original is read.

A further object of the present invention is to provide an image reader in which all of the read data does not need to be temporarily stored.

A still further object of the present invention is to provide an image reader in which superior quantity can be obtained by a simple structure.

In order to achieve the above objects, an image reader according to the present invention comprises a filter for stopping certain frequencies exceeding half the spatial frequency of a reading lattice. The image reader according to the present invention further comprises an arithmetic averaging means for averaging in an arithmetic manner four adjacent reading points of an original.

An image reader according to the present invention is provided with a 3×3 weighted averaging circuit. This averaging circuit outputs image data which is obtained by averaging in an arithmetic manner four results of arithmetic averages obtained by an arithmetic averaging means, the four results commonly including an image data item of one reading point of an image sensor of the CCD.

BRIEF DESCRIPTION OF THE DRAWINGS

FIG. 7(a) is a plan view illustrating the positional relationship between an image sensor according to the present invention and an original printed in an half-tone dot manner;

FIG. 7(b) is a graph of outputs of an image sensor according to the present invention;

FIGS. 7(c) and 7(d) are plan views illustrating the positional relationships of data which has been averaged in an arithmetic manner in an image reader according to the present invention;

FIG. 9 is a timing chart of another image reader according to the present invention;

DESCRIPTION OF THE PREFERRED EMBODIMENTS

Figure 1:
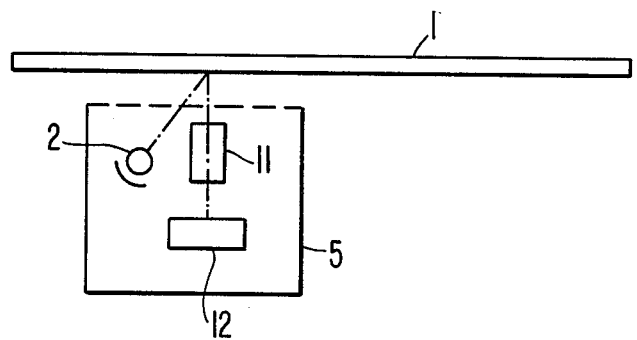
FIG. 1 is a block diagram of an image reader according to the present invention.

FIG. 1 is a block diagram of an image reader according to the present invention. In FIG. 1, an original 1 is irradiated with light from a light source 2. This light source 2 is mounted in a carriage 5. The light reflected from the surface of the original 1 penetrates a selfoc lens array (Nippon Sheet Glass Co., Ltd., hereinafter called a rod-lens array) 11 in which the internal refractive index varies in the radial direction. This light is then incident upon a contact type of image sensor 12.

Figure 2:
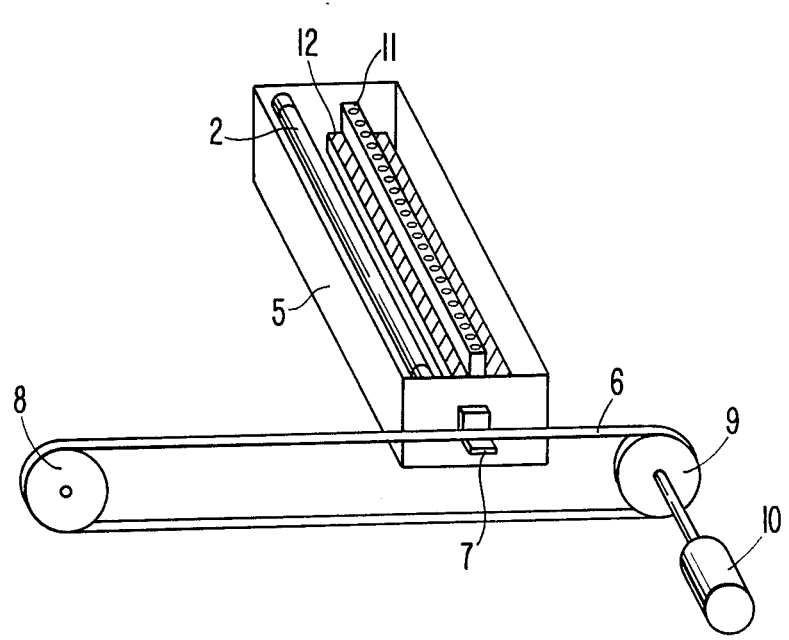
FIG. 2 is a partial perspective view of an image reader according to the present invention.
Figure 3:
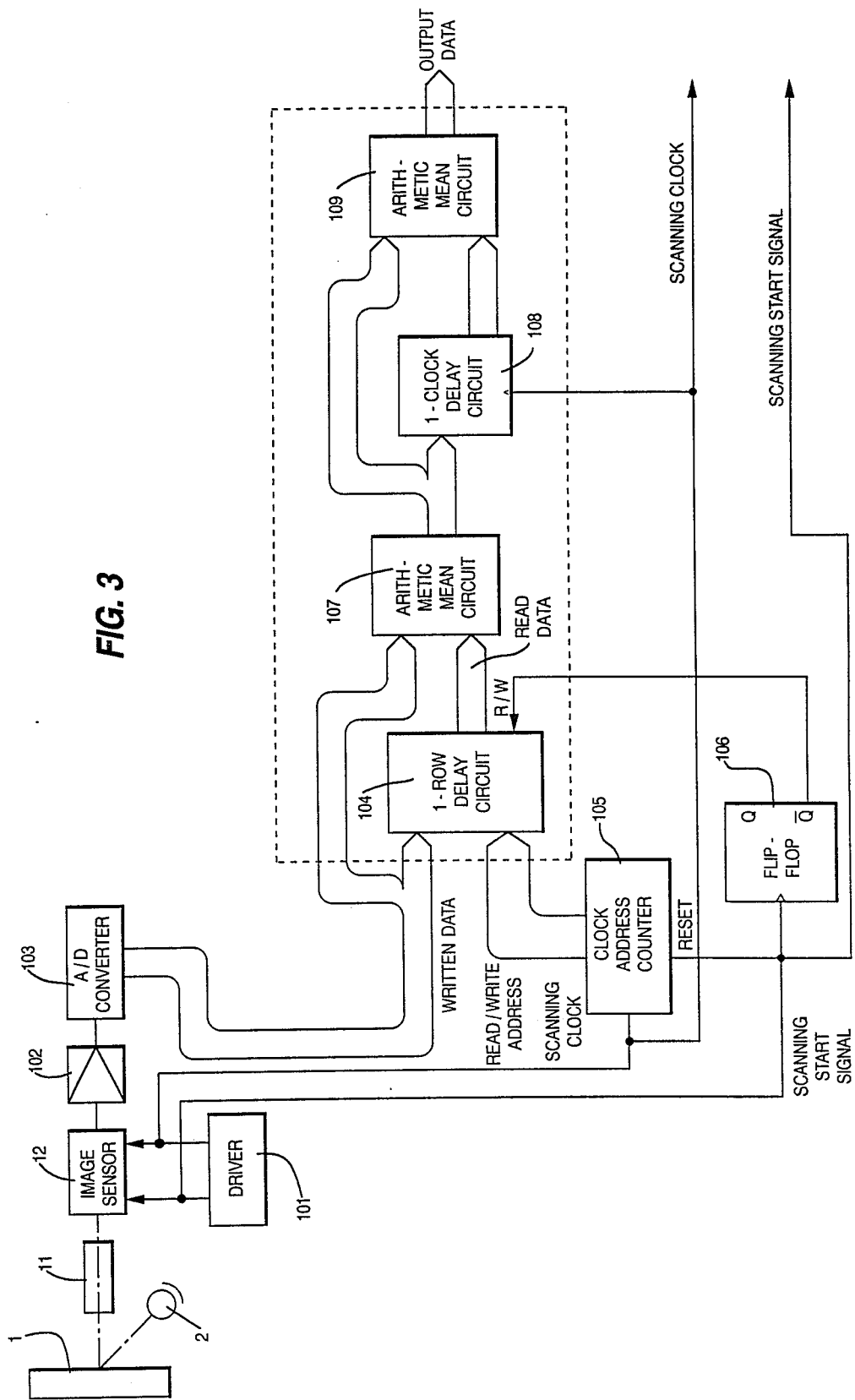
FIG. 3 is a circuit diagram of an image reader according to the present invention.

FIG. 2 is a perspective view illustrating an essential portion of the image reader according to the present invention. In FIG. 2, a belt 6 is fixed to the carriage 5 by a securing member 7. This belt 6 is arranged between a driving roller 9 and a sub-roller 8, and is driven by a motor 10. The carriage 5 is adapted to moved by the belt 6. FIG. 3 is a circuit diagram of an image reader. In FIG. 3, a driver 101 provides the image sensor 12 with a scanning start signal and a scanning clock. An amplifier 102 amplifies an output from the image sensor 12 to a suitable voltage, the output being sent in accordance with the scanning clock. An A/D converter 103 converts an output from the amplifier 102 into digital values. A 1-row delay circuit 104 stores the data for a line which is output from the A/D converter 103. The 1-row delay circuit 104 outputs data which has been read a line previously by reading devices of the image sensor 12 after the time necessary for the image sensor 12 to output the current image data for a line has elapsed, the reading devices for reading the previous line being same as those used for reading the current image data. An address counter 105 is reset by a scanning start signal output from the driver 101. The address counter 105 increments by 1 each time the scanning clock is input, and sequentially outputs addresses. A flip-flop 106 switches write and read functions of the 1-row delay circuit 104 by receiving the scanning start signal from the driver 101. An arithmetic mean circuit 107 adds the output from the A/D converter 103 and the data stored in the 1-row delay circuit 104, and averages it. A 1-clock delay circuit 108 outputs the output from the arithmetic mean circuit 107 delayed by one scanning clock An arithmetic mean circuit 109 averages in an arithmetic manner the output from the arithmetic mean circuit 107 and the output from the 1-clock delay circuit 108.

Figure 5A:
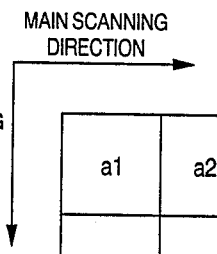
FIGS. 5(a), 5(b), and 5(c) are plan views illustrating a positional relationship between reading points to be averaged in an arithmetic manner by means of an image reader according to the present invention.

The operation of the thus-constituted image reader when reading image data of the original 1 shown in FIG. 5(a) will now be described.

Figure 4:
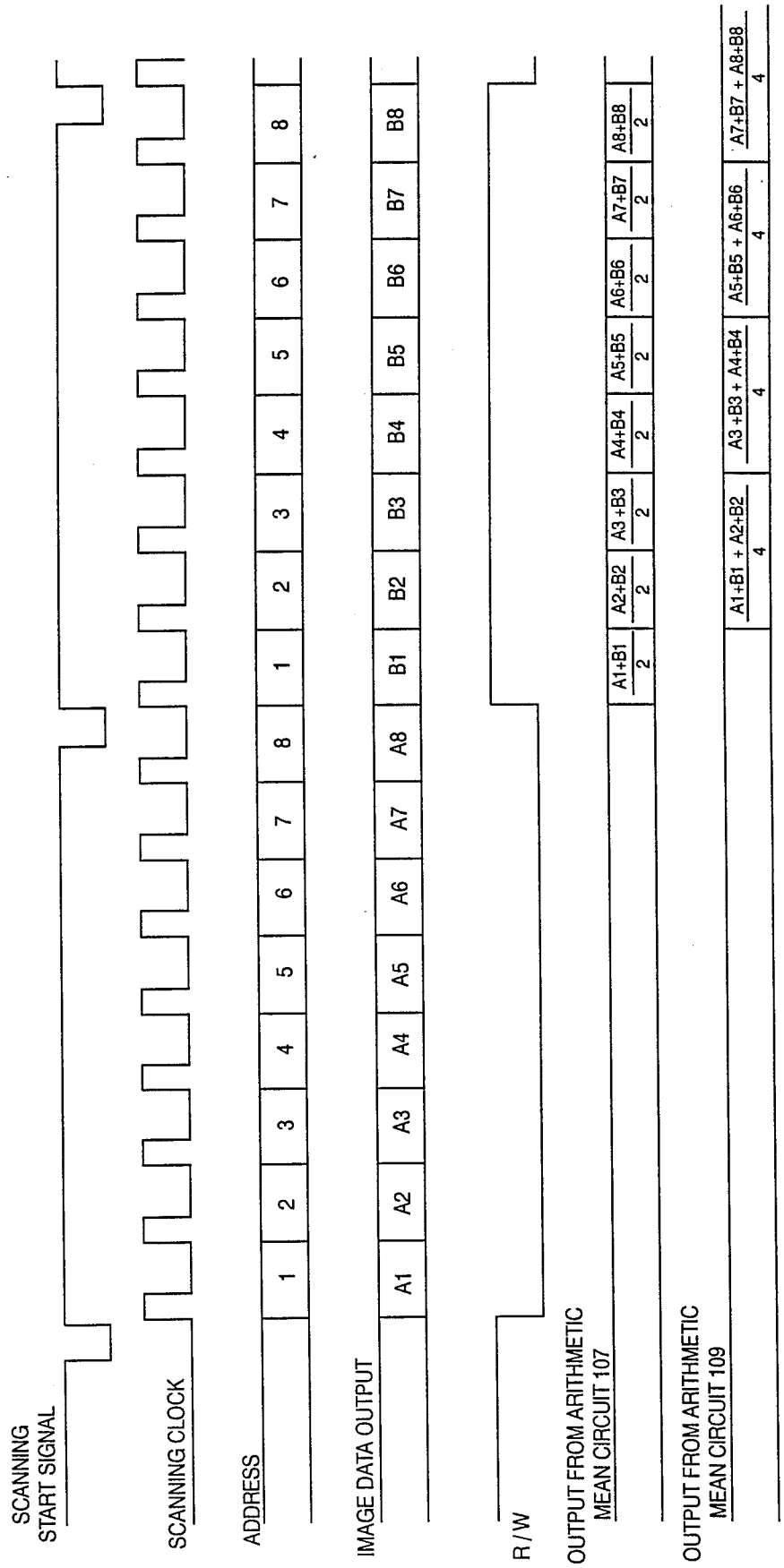
FIG. 4 is a timing chart of an image reader according to the present invention.

The image data items of the original 1 are read at points a1 to a8, b1 to b8, c1 to c8, and d1 to d8 in each of lines in the main scanning line direction (abbreviated to main scanning lines hereinafter). The carriage 5 is first moved by the motor 10 so as to be positioned for reading image data of points a1 to a8. At this point, the driver 101, as shown in FIG. 4, outputs the scanning start signal to the image sensor 12. The image sensor 12 sequentially outputs voltages whose values are determined in proportion to the degree of brightness of picture elements of the points a1 to a8 of the original. The output from the image sensor 12 is conducted in synchronization with the scanning clock.

After the picture elements of points a1 to a8 have been scanned, the carriage 5 moves to the position for reading image data of points b1 to b8. The scanning start signal and the scanning clock are then output from the driver 101 to the image sensor 12. As a result, picture elements of points b1 to b8 of the original are scanned, and image data is sequentially output.

This time, the voltages of this image data are amplified by the amplifier 102. This image data is then converted into digital values in proportion to the brightness level of the picture elements by means of the A/D converter 103. In a similar manner to that described above, image data of points c1 to c8 and points d1 to d8 is read.

Figure 5B:
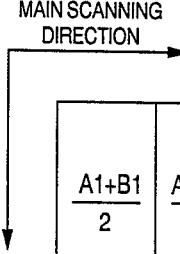

The image data of points a1 to a8, which is output in sequence by the first scanning start signal, is written into the 1-row delay circuit 104. The image data of points b1 to b8 is sequentially output immediately after the next scanning start signal is output. In this status, the 1-row delay circuit 104 is set to read out mode, and the image data items of points a1 to a8 are output in synchronization with the output of image data items of points b1 to b8 from the image sensor 12. This output data is input to the arithmetic mean circuit 107 wherein this data is averaged in an arithmetic manner. If the image data of each point is represented by A1 to A8, B1 to B8, C1 to C8, and D1 to D8, respectively, the data items are averaged by adding the items as shown in FIG. 5(b).

Figure 5C:
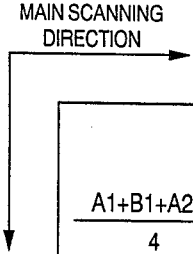

The data output from the arithmetic mean circuit 107 is retained for one scanning clock by the 1-clock delay circuit 108. By averaging by means of the arithmetic mean circuit 109 this retained data and the data which is next output by the arithmetic mean circuit 107, the results of averaging in an arithmetic mean manner image data items of four lattice points by adding them in the manner shown in FIG. 5(c) are sequentially output as shown in FIG. 4.

The operation when reading a half-tone original will now be described.

Light-receiving devices of the image sensor 12 are provided at a density of 16 per mm. The rod-lens array 11 is so constituted that its modulation transfer function (abbreviated to MTF hereinafter) is zero, in other words, the rod lens array 11 cannot distinguish any color tone when the spatial frequency exceeds half (8 line-pairs/mm) the spatial frequency (16 line-pairs/mm) of the light-receiving devices shown in FIG. 6 which illustrates the characteristics between MTF and spatial frequency. As a result, the image sensor 12 does not generate false signals because the contrast of components of an image exceeding 8 line-pairs/mm are made uniform.

As described above, the image sensor 12 only reads components with spatial frequencies of less than 8 line-pairs/mm; it outputs components with spatial frequencies exceeding 8 line-pairs/mm with uniform contrast. FIG. 7(c) illustrates the status when the image reader is reading a half-tone original. FIG. 7(d) shows the results of averaging in an arithmetic manner the outputs from the first scanning line and the second scanning line, which are considered to be same in this case.

Although a rod-lens array is employed as a filter in this embodiment, a crystal birefringence filter or a lens with a low resolving power may be employed instead.

As described above, the image reader according to the present invention can securely read frequencies of less than the spatial frequency of the reading lattice points by a sampling rule, and provides correction by averaging in an arithmetic manner. On the other hand, the image reader reads frequencies exceeding half the spatial frequency of the reading lattice points at a uniform contrast. As a result, no false signals are generated if the half-tone original has a density which is near the density of the lattice points, so that a stable reading can be performed. This aspect is achieved because the image reader according to the present invention is provided with a filter for excluding spatial frequencies exceeding half the spatial frequency of the reading lattice points, and a means for averaging an arithmetic manner image data items of four adjacent reading points.

An image reader of another embodiment according to the present invention will now be described.

Since the structure of the image reader in this embodiment is same as that shown in FIGS. 1 and 2, its description is omitted.

Figure 8:
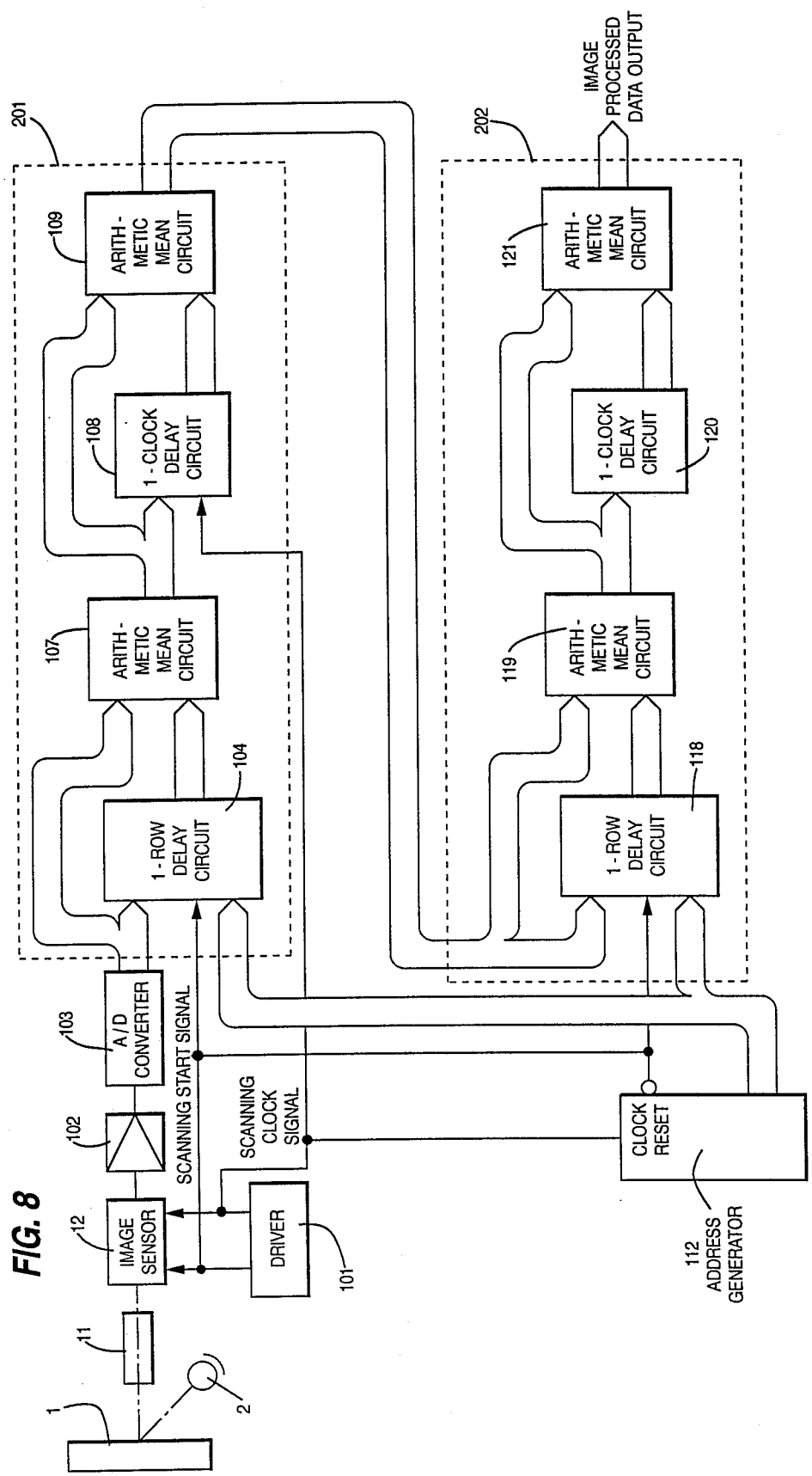
FIG. 8 is a circuit diagram of another image reader according to the present invention.

FIG. 8 is a circuit diagram of the image reader of this embodiment. The structures of the following components are the same as those shown in the first embodiment: the driver 101, the amplifier 102, the A/D converter 103, the 1-row delay circuit 104, the arithmetic mean circuits 107 and 109, and the 1-clock delay circuit 108. A 2×2 area mean circuit 201 comprises the 1-row delay circuit 104, the arithmetic mean circuits 107 and 109, and the 1-clock delay circuit 108. This 2×2 area mean circuit 201 as described in the first embodiment, averages in an arithmetic manner image data items of four adjacent reading points.

In FIG. 8, the 1-row delay circuit 118 stores data which was output by one line beforehand by the arithmetic mean circuit 109. The 1-row delay circuit 118 outputs data the line before the area which is read by the image sensor 12, this data corresponding to the output from the arithmetic mean circuit 109. The arithmetic mean circuit 119 averages the output from the arithmetic mean circuit 109 and the output from 1-row delay circuit 118. The 1-clock delay circuit 120 outputs the output from the arithmetic mean circuit 119 delayed by one scanning clock. The arithmetic mean circuit 120 averages in an arithmetic manner the output from the arithmetic mean circuit 119 and the output from the 1-clock delay circuit 120. A 3×3 area weighted mean circuit 202 comprises the 1-row delay circuit 118, arithmetic mean circuits 119 and 121, and a 1-clock delay circuit 120. When the image reader is reading image data shown in FIG. 10, the 3×3 area weighted mean circuit 202 is adapted to output image data which is a mean of four reading points which have been averaged by the 2×2 area mean circuit 201 after the following step: data of four areas which partially overlap each other, that is, data of 3×3 reading areas, is multiplied by the coefficients shown in FIG. 10(b), and is averaged. An address generator 112 comprises a counter (not shown ) which increments a count corresponding to the scanning clock. The address generator 112 generates addresses in the 1-row delay circuits 104 and 118, the addresses corresponding to the image data output from the reading devices of the image sensor 12.

Referring to the timing chart shown in FIG. 9, the operation of the image reader of this embodiment will now be described.

Figures 6, 10A, 10B:
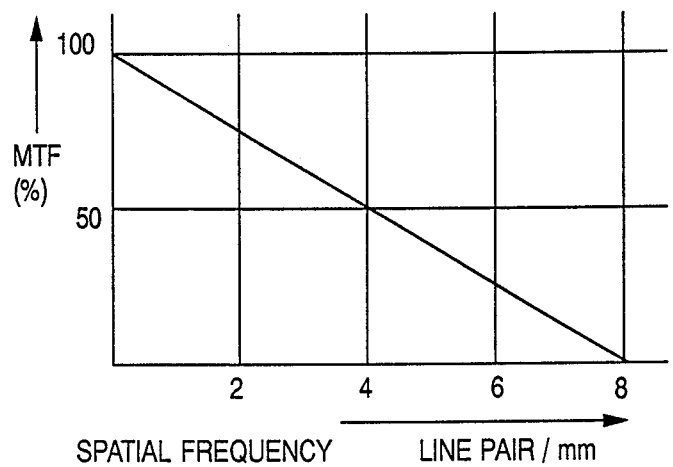
FIG. 6 is a graph of characteristics of a rod-lens array of an image reader according to the present invention.
FIG. 10(a) is a plan view illustrating reading points on an original in another image reader according to the present invention.
FIG. 10(b) is a plan view illustrating a distribution of coefficients of another image reader according to the present invention.

As shown in FIG. 10(a), the original 1 is, in a similar manner to that in the first embodiment, irradiated with light from the light source 2 as lines a, b, c, and d are read by means of the image sensor 12. The light reflected from the surface of the original 1 is condensed by the rod-lens array 3, and focused on the reading devices of the image sensor 12. The reading devices of the image sensor 12 output voltages corresponding to image data of positions along the line a of the original 1. The image sensor 12, as shown in FIG. 9, sequentially outputs data items A1 to A7 of each of the reading devices corresponding to the scanning clock signals. These data items A1 to A7 are stored in the 1-row delay circuit 104.

The carriage 5 is then moved to the next reading line b. The image sensor 12 starts outputting image data of the next line b. At the same time, the 1-row delay circuit 104 outputs data for the previous line read by the same reading device, and simultaneously stores new data. For the first reading point, data A1 is output from the 1-row delay circuit 104, and data B1 is simultaneously stored.

The arithmetic mean circuit 107 then averages in an arithmetic manner the data of line b and the data of line a which has been output from the 1-row delay circuit 104. As a result, values (A1+B1)/2, (A2+B2)/2 ... are sequentially output from the arithmetic mean circuit 105 in accordance with the clock signals.

The output from the arithmetic mean circuit 107 is input to the 1-clock delay circuit 108. The 1-clock delay circuit 108 outputs this input delayed by one scanning clock. As a result, the arithmetic mean circuit 109 averages the output from the arithmetic mean circuit 107 and the data one point before from the arithmetic mean circuit 107. That is, the arithmetic mean circuit 109 sequentially outputs values (A1+B1+A2+B2)/2, (A2+B2+A3+B3)/2 ... starting from when the image sensor 12 outputs the second reading point of line b. The output from the arithmetic circuit 109 become a mean value of image data of the 2×2 area. The output from the arithmetic mean circuit 109 is sequentially stored in the 1-row delay circuit 118.

The carriage 5 moves to line c when the reading of line b has been completed, and the image sensor 12 starts outputting the data of line c.

In a similar manner to that of the reading line b, the arithmetic circuit 109 sequentially outputs values (B1+C1+B2+C2)/4, (B2+C2+B3+C3)/4 ... starting from when the data of the second reading point has been read. During this time, the 1-row delay circuit 118 sequentially outputs the output from the arithmetic mean circuit 109, the output being the mean of line b which is one line before. The arithmetic mean circuit 119 averages in an arithmetic manner the output from the arithmetic mean circuit 109 and the output from the 1-row delay circuit 118, this averaging corresponding to the scanning clock signal. The arithmetic mean circuit 119 sequentially outputs values (A1+2×B1+C1+A2+2×B2+C2)/8, (A2+2×B2+C2+A3+2×B3+C3)/8 ...

The data output by the arithmetic mean circuit 119 is output by a 1-clock delay circuit 120 delayed by one clock. The output from the arithmetic mean circuit 119 and the output from the 1-row delay circuit 120 is averaged in an arithmetic manner by the arithmetic mean circuit 121. As a result, values {4×B2+2×(A2+B1+B3+C2)+A1+A3+C1+C3)/16, {4×B3+2×(A3+B2+B4+C3)+A2+A4+C2+C4}/16 ... are sequentially output by the arithmetic mean circuit 121, starting from when the second reading point of line c has been read.

This first data items corresponds to the result of multiplying the data of the reading points of a 3×3 area adjacent to the second reading point of line b by the coefficients shown in FIG. 10(b).

The image reader in this embodiment can sequentially provide weighted means of the data of 3×3 areas corresponding to the scanning clock signals, and as a result, the data need not be stored in a memory, read, and averaged. Consequently data which has been averaged can be obtained in a short time.

As hereinbefore described, the image reader of this embodiment comprises a 2×2 arithmetic mean circuit for averaging in an arithmetic manner image data of four points which forming a minimum frame of lattice points of the original read by the image scanner, the arithmetic mean circuit averaging the image data in accordance with clock signals. The image reader of this embodiment further comprises a 3×3 arithmetic mean circuit for outputting the output from the 2×2 arithmetic mean circuit in which image data of a certain point is included, as image data in accordance with the clock signals. Image data processed by the following step can be obtained at each clock: the image data of a reading point is multiplied by four, and image data of the four points directly adjacent to that reading point is multiplied by two, and those values and values of image data of the four points diagonally adjacent to the reading point are added together, and divided by 16. Therefore, it is not necessary to store the data in a memory then read it out again to average it. Consequently, averaged data can be obtained in a short time.

What is claimed is:

1. An image reader for reading image data of an original at each of a number of lattice points comprising:
   a detecting means for reading data of the original, in which a plurality of reading devices are disposed in a line;
   a filter which is disposed between said detecting means and said original, and which has characteristics such that a modulation transfer function thereof becomes zero when light of spatial frequencies exceeding half the spatial frequency of said lattice points is input; and
   an arithmetic mean averaging means for mean averaging image data of four points which form the vertexes of a minimum square of said lattice points.

2. An image reader according to claim 1, wherein said detecting means is movably supported in the direction perpendicular to the row of said reading devices, and is adapted to move in said perpendicular direction whenever image data for a line has been read, so that each image data can be read by said detecting means.

3. An image reader according to claim 1, wherein said filter is a rod-lens array in which is provided a plurality of cylindrical lenses in which the refractive index is changed in the radial direction.

4. An image reader according to claim 1, wherein said filter is a crystal birefringence lens.

5. An image reader according to claim 1, wherein said filter is a lens of a low resolving power.

6. An image reader for reading image data of an original at each of a number of lattice points thereof comprising:
   a detecting means for reading data of said original, in which a plurality of reading devices are disposed in a row;
   a filter which is disposed between said detecting means and said original, and which has characteristics such that a modulation transfer function value thereof becomes zero when light of spatial frequencies exceeding half the spatial frequency of said lattice points is input;
   an arithmetic averaging means for averaging image data of four points which form the vertexes of a minimum square of said lattice points;
   a weighted arithmetic averaging means for sequentially averaging four outputs from said arithmetic averaging means which in common include image data of a certain reading point where said detecting means has read the data in accordance with clock signals and outputting said average as image data.

7. An image reader comprising:
   and image scanner having a plurality of reading devices and being arranged to input image data for a line, and sequentially output image data of said reading devices in accordance with clock signals;
   a moving means for moving a reading line of said image scanner;
   a 2×2 arithmetic averaging means for sequentially averaging in accordance with clock signals image data of four points which form a minimum frame of lattice points of an original corresponding to points read by said image scanner; and
   a 3×3 arithmetic averaging circuit for sequentially averaging four outputs from said 2×2 arithmetic averaging circuit which in common include image data of a certain reading point read by said image scanner in accordance with clock signals and outputting said average as image data;

wherein said 2×2 arithmetic averaging means comprises:
a first 1-row delay circuit for storing image data of the previous line read by said image scanner, and for outputting data read by the same reading devices in synchronization with the output of image data from said image scanner;
a first arithmetic averaging circuit for averaging the output from said image scanner and the output from said 1-row delay circuit;
a first 1-clock delay circuit for re-outputting the output from said first arithmetic averaging circuit, delayed by one clock; and
a second arithmetic averaging circuit for averaging the output from said arithmetic averaging circuit and the output from said first 1-clock delay circuit.

8. An image reader according to claim 7, wherein said 3×3 arithmetic averaging circuit comprises:
a second 1-row delay circuit for storing the results of averaging in an arithmetic manner the image data of a line which is one line before the output from said second arithmetic averaging circuit, and for outputting the results of averaging in an arithmetic manner the image data of the same area read by said image sensor in synchronization with outputting the results of averaging in an arithmetic manner obtained by said second arithmetic averaging circuit;
a third arithmetic averaging circuit for averaging the results of averaging in an arithmetic manner the results of averaging in an arithmetic manner obtained by said second arithmetic averaging circuit and the results of averaging in an arithmetic manner obtained by said second 1-row delay circuit;
a second 1-clock delay circuit for re-outputting the output from said third arithmetic averaging circuit, delayed by one clock; and
a fourth arithmetic averaging circuit for averaging the results of averaging in an arithmetic manner obtained by said third arithmetic averaging circuit and the output from said second 1-clock delay circuit.

* * * * *